(12) United States Patent
McKeown

(10) Patent No.: US 6,515,991 B1
(45) Date of Patent: *Feb. 4, 2003

(54) COMBINED UNICAST AND MULTICAST SCHEDULING

(75) Inventor: Nicholas W. McKeown, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/710,358

(22) Filed: Nov. 9, 2000

Related U.S. Application Data

(63) Continuation of application No. 08/673,216, filed on Jun. 27, 1996, now Pat. No. 6,212,182.

(51) Int. Cl.[7] .............................................. H04L 12/56
(52) U.S. Cl. ...................... 370/390; 370/416; 370/432; 709/240
(58) Field of Search ................................. 370/355, 386, 370/388, 389, 390, 395.1, 398, 411, 412, 415, 416, 428, 429, 432, 445, 447; 359/117, 128, 135, 139; 709/213, 238, 240

(56) References Cited

U.S. PATENT DOCUMENTS 5,802,052 A * 9/1998 Venkataraman ............. 370/395

* cited by examiner

*Primary Examiner*—Alpus H. Hsu
(74) *Attorney, Agent, or Firm*—Campbell Stephenson Ascolese LLP

(57) ABSTRACT

A method and system for combined unicast and multicast scheduling. Data cells are assigned at each input to one unicast input queue for each output or to a single multicast input queue. Each input makes two requests for scheduling to each output for which it has a queued data cell, one unicast request and one multicast request. Each output grants up to one request, choosing highest priority requests first and giving precedence to one such highest priority request using an output precedence pointer. The output precedence pointer is either an individual output precedence pointer specific to that output for unicast data cells or a group output precedence pointer generic to all outputs for multicast data cells. Each input accepts up to one grant for unicast data cells or as many grants as possible for multicast data cells, choosing highest priority grants first and giving precedence to one such highest priority grant using an input precedence pointer. In one embodiment, the individual output precedence pointers each implement a round-robin precedence technique in which the most recent input to transmit a data cell has the lowest precedence; the pointer is incremented to point to a next input each time a data cell is transmitted from the pointed-to input.

35 Claims, 2 Drawing Sheets

COMBINED UNICAST AND MULTICAST SCHEDULING

RELATED APPLICATION

This is a Continuation of U.S. patent application Ser. No. 08/673,216 filed Jun. 27, 1996, now U.S. Pat. No. 6,212,182 entitled "Combined Unicast and Multicast Scheduling" by Nicholas McKeown.

BACKGROUND OF THE INVENTION

1. Field of the Invention

This invention relates to combined unicast and multicast scheduling.

2. Description of Related Art

In communication networks in which fast switching is desired, one switching technique which has become common is to use an input-queued, nonblocking switch. These switches have the property that each possible input may be coupled to each possible output, and that data cells to be switched are queued at the input to the switch without effect on operation of the switch.

It often occurs in such switches that several inputs will simultaneously contend for the same output, and moreover that one input will simultaneously have data cells available for more than one output. Several techniques are known for selecting which input to couple to which output at each particular switching time, so as to achieve the greatest possible data cell flow through the switch while ensuring that every input is communicated to its desired output within a reasonable time.

U.S. Pat. No. 5,267,235, titled "Method and Apparatus for Resource Arbitration", issued in the name of Charles P. Thacker and assigned to Digital Equipment Corporation, describes one switching technique, herein called "Parallel Iterative Matching" or PIM. In the PIM technique, unmatched inputs and outputs are scheduled by a three-part process, in which (1) each unmatched input sends a request to every output for which it has a queued data cell; (2) each unmatched output which receives at least one request selects among them randomly and grants the selected request; and (3) each input which receives at least one grant selects among them and accepts the selected grant.

Nicolas McKeown's Ph.D. Thesis at the University of California (Berkeley), titled "Scheduling Cells in an Input Queued Switch", submitted May 1995, describes another switching technique, herein called "Rotating Priority Iterative Matching" or RPIM. The RPIM technique improves on the PIM technique by introducing a grant precedence pointer at each output which rotates among the unmatched inputs, and requiring each output to grant to the input nearest the grant precedence pointer in preference to all other inputs.

One problem which has arisen in the art is that the input cells are often an intermixed stream of unicast cells (destined for a single output) and multicast cells (destined for more than one output). Both the PIM technique and the RPIM technique suffer from the drawback that they are not well suited for switching multicast data cells.

Another problem which has arisen in the art is that it is often desired to assign priorities to data cells, so that, for example, data cells carrying certain classes of data are more likely to arrive at their destination without excess switching delays. Both the PIM technique and the RPIM technique suffer from the drawback that they are complicated by attempts to simultaneously switch multiple priorities of data cells.

When the input stream of data cells intermixes both unicast and multicast data cells, each data cell being prioritized with one of multiple priorities, the PIM technique and the RPIM technique do not achieve satisfactory results.

Accordingly, it would be advantageous to provide a technique for combined unicast and multicast scheduling, and further to provide a technique for combined unicast and multicast scheduling which operates well with prioritized data cells.

SUMMARY OF THE INVENTION

The invention provides a method and system for combined unicast and multicast scheduling. Data cells are assigned at each input, to one unicast input queue for each output or to a single multicast input queue. Each input makes two requests for scheduling to each output for which it has a queued data cell, one unicast request and one multicast request. Each output grants up to one request, choosing highest priority requests first, and giving precedence to one such highest priority request using an output precedence pointer, either an individual output precedence pointer. The output precedence pointer is which is specific to that output for unicast data cells, or a group output precedence pointer which is generic to all outputs for multicast data cells. Each input accepts up to one grant for unicast data cells or as many grants as possible for multicast data cells. Each input chooses the highest priority grants first, giving precedence to one such highest priority grant using an input precedence pointer.

In a preferred embodiment, the individual output precedence pointers each implement a round-robin precedence technique, in which the most recent input to transmit a data cell has the lowest precedence. The pointer is incremented to point to a next input each time a data cell is transmitted from the pointed-to input. The input precedence pointers each preferably implement an identical precedence technique. However, the group output precedence pointer is not incremented until all outputs from the multicast data cell for the pointed-to input have been transmitted.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue experimentation.

Overview of the Method for Scheduling

In the method for scheduling, unicast and multicast data cells are received in an input stream and are queued separately for input. Each unicast data cell is queued in a unicast input queue directed to its particular output destination. Multicast data cells are separately queued in a single multicast input queue which is directed to a plurality of output destinations. Because multicast data cells might not be directed to all possible output destinations (if so they would be called "broadcast" data cells), they are tagged with output identifiers for all of their output destinations.

The method for scheduling includes three parts:

1. Each input makes requests to its output destinations, one for each unicast input queue and one for the multicast input queue.

2. Each output examines its received requests and grants the request of the input whose associated data cell has the highest priority and precedence. Priority is determined by priority tags assigned to the data cells. Precedence is determined for unicast data cells by an individual precedence pointer for each output, which is updated using a round-robin technique as unicast data cells are transmitted. Precedence is determined for multicast data cells by a group precedence pointer for all outputs collectively, which is updated using a round-robin technique as multicast data cells are transmitted.

3. Each input examines its received grants and accepts the grant of the output which allows transmission of the data cell with the highest priority and precedence. Precedence is determined for unicast data cells by a precedence pointer for each input, which is updated using a round-robin technique as unicast data cells are transmitted. Multicast data cells are simply transmitted to all outputs which grant the request, unless a specific output has a higher-priority unicast data cell to be transmitted.

Those inputs and outputs which are scheduled using this technique are removed from consideration and the technique is re-applied until all inputs and all outputs are scheduled or until another termination criterion (e.g., until expiration of a timer or until a fixed number of re-applications are performed) is met.

When scheduling of inputs and outputs is complete, data cells are transmitted according to the schedule and precedence pointers are updated.

Switch with Unicast and Multicast Queues

Figure 1:
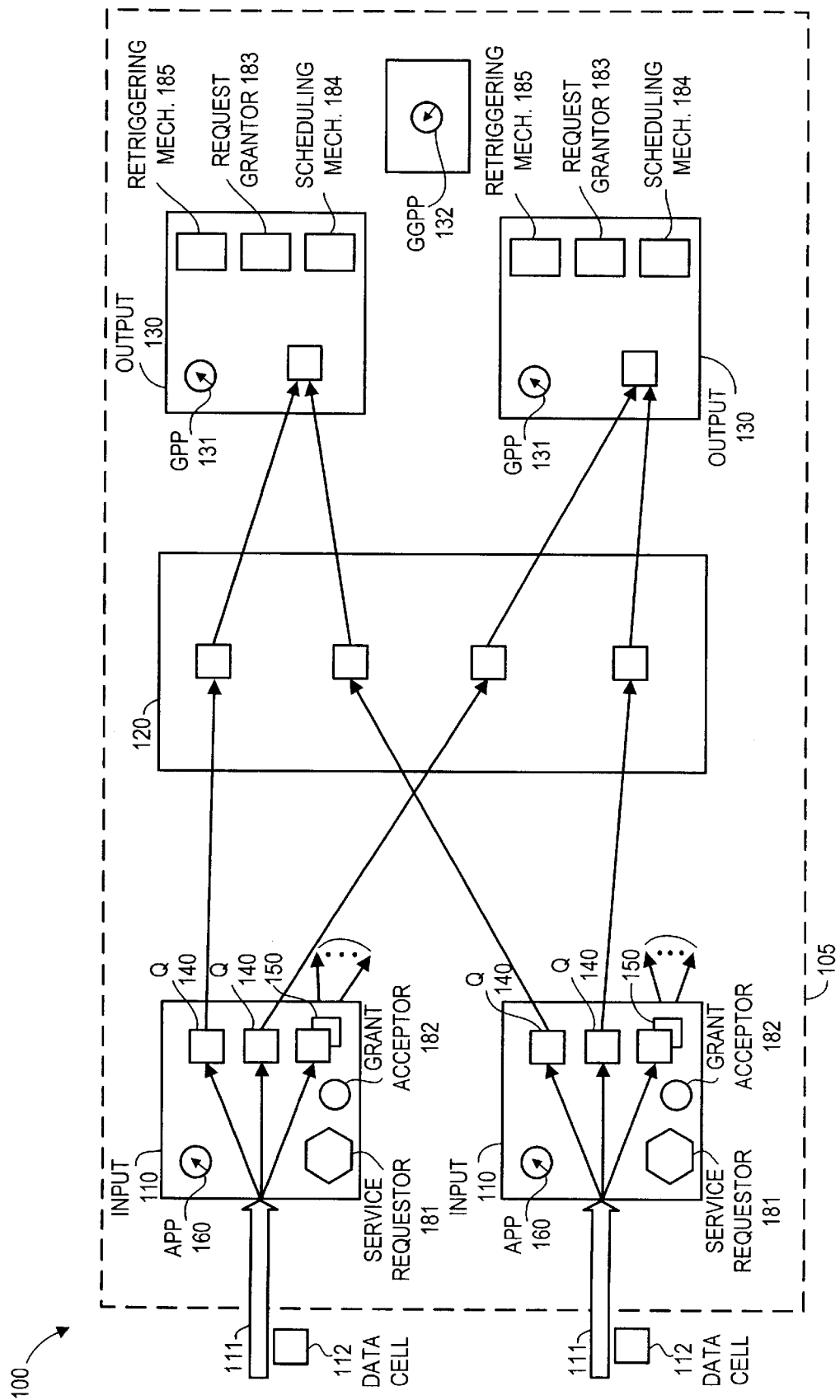
FIG. 1 shows a switch with unicast and multicast queues.

FIG. 1 shows a switch with unicast and multicast queues.

A system 100 for switching unicast and multicast data cells comprises a plurality of M inputs 110, a nonblocking M×N switch 120, and a plurality of N outputs 130. System 100 may be implemented, in some embodiments, in a memory 105.

In a preferred embodiment, the switch 120 comprises a crossbar switch. However, in alternative embodiments, the switch 120 may comprise a Batcher-Banyan self-routing switch or any other nonblocking switch architecture.

In a preferred embodiment, the switch 120 has 16 inputs and 16 outputs; thus, M=16 and N=16. However, in alternative embodiments, the switch 120 may have any other number of inputs or outputs; thus, M and N may take on any other values. Although in a preferred embodiment, M=16 and N=16, the switch 120 is illustrated here for simplicity with M=2 and N=2; it would be immediately clear to those skilled in the art, after perusing this application, how to make and use the invention with other values of M and N.

Each input 110 is coupled to an input stream 111 of data cells 112. Each data cell 112 comprises a data payload, an output identifier, and a priority tag.

The data payload includes the data which is transmitted with the data cell 112 from the input 110 to the output 130, and may further include control information such as parity, CRC bits, or flow control, all of which have no effect on the operation of the switch 120.

The output identifier is a value which selects among the N outputs 130.

The priority tag is a value which selects among a plurality of possible priorities. In a preferred embodiment, there are 8 possible priorities, with 0 indicating the highest priority and 7 indicating the lowest priority. However, in alternative embodiments, a different number or different tagging values for priorities may be used.

In a preferred embodiment, each data cell 112 has a uniform length. In alternative embodiments, data cells 112 may have variable lengths; however, those variable lengths should generally be less than one switching time for the switch 120 to avoid complicating the scheduling technique.

Each input 110 comprises a plurality of unicast input queues 140, a multicast input queue 150, a service requester 181, a grant acceptor 182, and an accept precedence pointer (APP) 160.

Each unicast input queue 140 is coupled using the switch 120 to a single output 130. Thus, data cells 112 in a unicast input queue 140 are specifically directed to its associated output 130.

The multicast input queue 150 is coupled, using the switch 120, to all the outputs 130. Thus, data cells 112 in the multicast input queue 150 may be directed to any one or more of the outputs 130.

The accept precedence pointer 160 points to a single output 130.

Each output 130 comprises a grant precedence pointer (GPP) 131, a request grantor 183, a scheduling mechanism 184, and a retriggering mechanism 185. The grant precedence pointer 131 points to a single input 110.

The system 100 also comprises a group grant precedence pointer (GGPP) 132. The group grant pointer 132 points to a single input 110.

Method of Scheduling Intermixed Unicast and Multicast Data Cells

Figure 2:
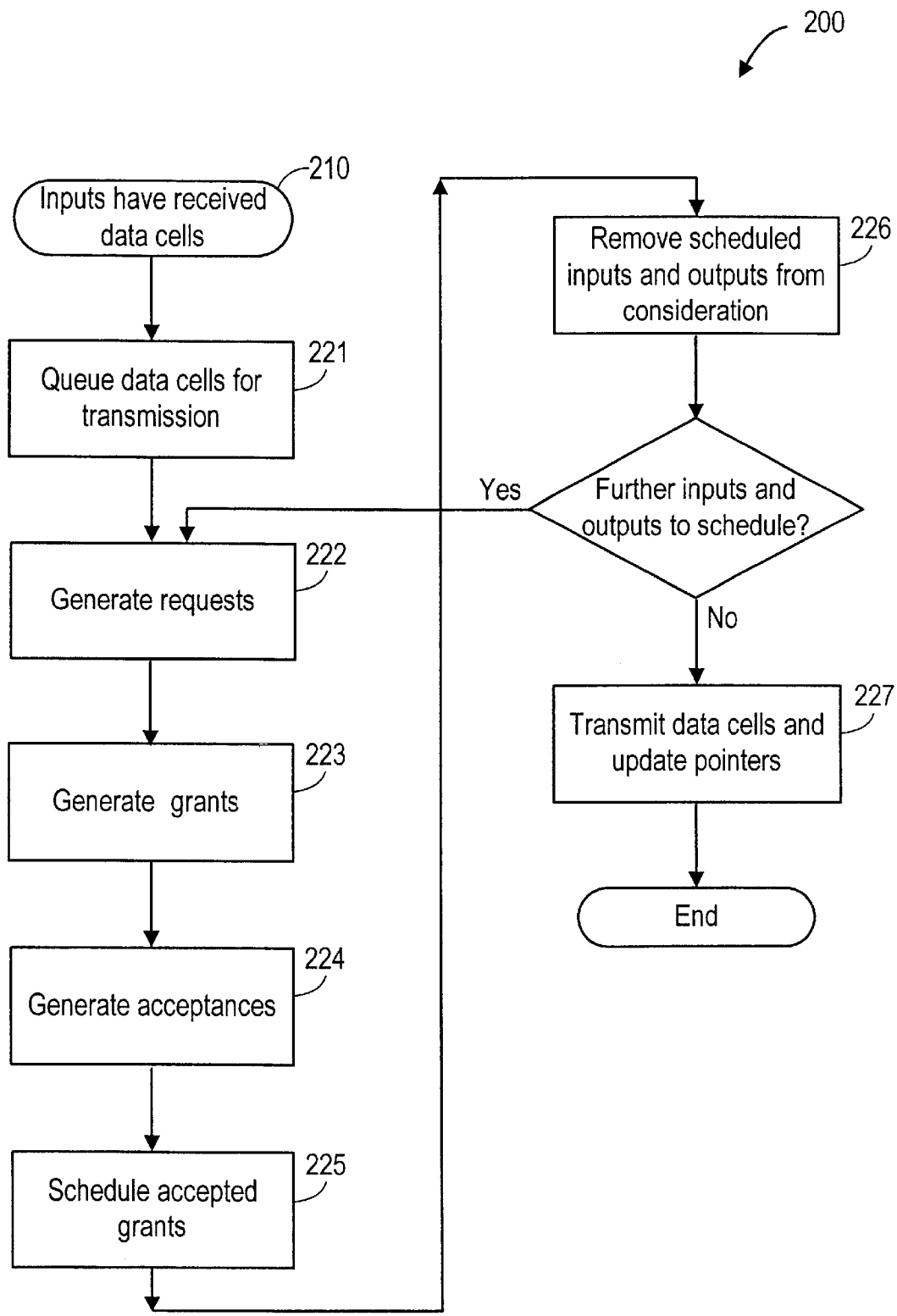
FIG. 2 shows a method of scheduling a input stream of intermixed unicast and multicast data cells.

FIG. 2 shows a method of scheduling an input stream of intermixed unicast and multicast data cells. A method 200 is executed by the inputs 110, the switch 120, and the outputs 130, using the grant precedence pointer 131, the group grant precedence pointer 132, and the accept precedence pointer 160.

It would be clear to those skilled in the art that the inputs 110, the switch 120, and the outputs 130 may comprise appropriate devices for carrying out the steps described herein, and that such appropriate devices may comprise either special-purpose hardware or a general-purpose computing element operating under control of appropriate software.

At a flow point 210, the inputs 110 have received data cells 112 for transmission to the outputs 130. At this flow point, the grant precedence pointer 131 and the group grant precedence pointer 132 may point to any output 130. The accept precedence pointer 160 may point to any input 110.

At a step 221, the inputs 110 queue the received data cells 112 for transmission. Unicast data cells 112 are queued in the unicast input queues 140 responsive to their respective output identifiers. Multicast data cells 112 are queued in the multicast input queues 150.

At a step 222, each input 110 examines its unicast input queues 140 and generates a request to each output 130 for which its associated input queue 140 is non-empty. Each input 110 also examines its multicast input queue 150, and generates a further request to each output 130, which is an output destination for the lead data cell 112 in the multicast input queues 150.

At a step 223, each output 130 examines the requests it has received and selects (grants) the request which has the highest priority. If there is more than one such request (i.e., there are multiple requests with the same priority and there is no request with higher priority), the output 130 selects the request with the highest precedence. The output 130 generates a grant in response to the selected request.

For each output 130, the request with the highest precedence is the one from the input 110 which is nearest to (for unicast requests) the individual grant precedence pointer 131 for that output 110, or nearest to (for multicast requests) the group grant precedence pointer 132.

At a step 224, each input 110 examines the grants it has received, associates each grant with a request it generated, and selects (accepts) that grant with the associated request with the highest priority. If there is more than one such grant (i.e., there are multiple requests with the same priority and there is no request with higher priority), the input 110 selects the grant with the highest precedence. The input 110 generates an acceptance in response to the selected grant.

For each input 110, the grant with the highest precedence is the one from the output 130 which is nearest to (for grants on unicast requests) the accept precedence pointer 160 for that input 130.

For multicast requests, each input accepts as many grants as possible.

At a step 225, those grants which have been accepted are scheduled.

At a step 226, those inputs 110 and those outputs 130 which have been scheduled are removed from consideration, and the switch 120 determines if there are any further inputs 110 or outputs 130 to be scheduled, or if any other termination criterion is met. If there further inputs 110 or outputs 130 to be scheduled and no other termination criterion is met, the method continues with the step 222, and the technique is re-applied (retriggered) to those inputs 110 and those outputs 130 which remain for consideration. Otherwise, the method continues with the step 227.

In a preferred embodiment, the method also terminates after a fixed number (such as four) of scheduling re-applications have been performed. However, in alternative embodiments, other termination criteria may include expiration of a timer, or there may be no other termination criteria.

At a step 227, when scheduling of inputs and outputs is complete, data cells are transmitted according to the schedule and precedence pointers are updated.

For each input 110, the accept precedence pointer 160 is updated to the next output 130 (thus, one output 130 past the output 130 scheduled by that input 110) if and only if a data cell 112 was transmitted by that input 110. For each output 130, the individual grant precedence pointer 131 is updated to the next input 110 (thus, one input 110 past the input 110 scheduled by that output 130) if and only if a unicast data cell 112 was transmitted to that output 130.

The group grant precedence pointer 132 is updated to the next input 110 if and only if a multicast data cell 112 was completely transmitted to all its designated outputs 130. If the multicast data cell 112 was transmitted to only some of its designated outputs 130, the group grant precedence pointer 132 is not updated, and remains pointing to the input 110 having that multicast data cell 112. The multicast data cell 112 itself is updated to indicate that it was transmitted to some, but not all, of its designated outputs 130.

In a preferred embodiment, the group grant precedence pointer 132 is updated only for completely transmitted multicast data cells 112, so that multicast data cells 112 can be completely cleared from their inputs 110. However, in alternative embodiments, the group grant precedence pointer 132 may be updated on other conditions, such as when multicast data cells 112 are partially transmitted to any of their designated outputs 130, to a majority of their designated outputs 130, to any selected fraction of their designated outputs 130, or some other condition.

Alternative Embodiments

Although preferred embodiments are disclosed herein, many variations are possible which remain within the concept, scope, and spirit of the invention, and these variations would become clear to those skilled in the art after perusal of this application.

I claim:

1. A method of scheduling unicast and multicast cells in a nonblocking switch, said nonblocking switch comprising a plurality of inputs and a plurality of outputs, said cells each having a designated output and a priority, wherein said method comprises, at a scheduling time:

requesting service for each said input from said designated outputs for said unicast and multicast cells queued at each said input;

granting requests for each said output responsive to said priority and responsive to a grant precedence pointer for said request, wherein said grant precedence pointer is responsive to an individual grant precedence pointer for said unicast cells and responsive to a group grant precedence pointer for said multicast cells;

accepting grants for each said input responsive to said priority and responsive to an accept precedence pointer for said grant; and updating said group grant precedence pointer.

2. The method of claim 1, wherein said updating is performed when each said multicast cell is transmitted to all designated outputs.

3. The method of claim 1, wherein said updating is performed when each said multicast cell is transmitted to less than all designated outputs.

4. The method of claim 1, wherein said priority comprises a plurality of tagging values.

5. The method of claim 4, wherein said tagging values are integer values.

6. The method of claim 1, wherein said nonblocking switch is a crossbar switch.

7. The method of claim 1, wherein said nonblocking switch is a Batcher-Banyan self-routing switch.

8. An apparatus for scheduling unicast and multicast cells in a nonblocking switch, said nonblocking switch comprising a plurality of inputs and a plurality of outputs, said cells having a designated output and a priority, comprising:

a plurality of unicast input queues at each said input for queuing said unicast cells;

a multicast queue at each said input for queuing said multicast cells;

an accept precedence pointer, indicative of one of said inputs, associated with each said input;

an individual grant precedence pointer, indicative of one of said inputs, associated with each said output;

a group grant precedence pointer indicative of one of said inputs; and circuitry connected thereto, said circuitry configured to:
   request service for each said input from said designated outputs for said unicast and multicast cells queued at each said input;

grant requests for each said output responsive to said priority and responsive to said grant precedence pointer for said request;

accept grants for each said input responsive to said priority and responsive to said accept precedence pointer for said grant, and update said group grant precedence pointer;

wherein said grant precedence pointer is responsive to said individual grant precedence pointer for said unicast cells and responsive to said group grant precedence pointer for said multicast cells.

9. The apparatus of claim 8, wherein said update is performed when each said multicast cell is transmitted to all designated outputs.

10. The apparatus of claim 8, wherein said update is performed when each said multicast cell is transmitted to less than all designated outputs.

11. The apparatus of claim 8, wherein said priority comprises a plurality of tagging values.

12. The apparatus of claim 11, wherein said tagging values are integer values.

13. The apparatus of claim 8, wherein said nonblocking switch is a crossbar switch.

14. The apparatus of claim 8, wherein said nonblocking switch is a Batcher-Banyan self-routing switch.

15. A computer system for scheduling unicast and multicast cells in a nonblocking switch, said nonblocking switch comprising a plurality of inputs and a plurality of outputs, said cells each having a designated output and a priority, at a scheduling time, comprising computer instructions for:

requesting service for each said input from said designated outputs for said unicast and multicast cells queued at each said input;

granting requests for each said output responsive to said priority and responsive to a grant precedence pointer for said request, wherein said grant precedence pointer is responsive to an individual grant precedence pointer for said unicast cells and responsive to a group grant precedence pointer for said multicast cells;

accepting grants for each said input responsive to said priority and responsive to an accept precedence pointer for said grant, and updating said group grant precedence pointer.

16. The computer system of claim 15, wherein said updating is performed when each said multicast cell is transmitted to all designated outputs.

17. The computer system of claim 15, wherein said updating is performed when each said multicast cell is transmitted to less than all designated outputs.

18. The computer system of claim 15, wherein said priority comprises a plurality of tagging values.

19. The computer system of claim 18, wherein said tagging values are integer values.

20. The computer system of claim 15, wherein said nonblocking switch is a crossbar switch.

21. The computer system of claim 15, wherein said nonblocking switch is a Batcher-Banyan self-routing switch.

22. A computer-readable storage medium, comprising computer instructions for:

requesting service for each said input from said designated outputs for said unicast and multicast cells queued at each said input;

granting requests for each said output responsive to said priority and responsive to a grant precedence pointer for said request, wherein said grant precedence pointer is responsive to an individual grant precedence pointer for said unicast cells and responsive to a group grant precedence pointer for said multicast cells;

accepting grants for each said input responsive to said priority and responsive to an accept precedence pointer for said grant, and updating said group grant precedence pointer.

23. The computer-readable storage medium of claim 22, wherein said updating is performed when each said multicast cell is transmitted to all designated outputs.

24. The computer-readable storage medium of claim 22, wherein said updating is performed when each said multicast cell is transmitted to less than all designated outputs.

25. The computer-readable storage medium of claim 22, wherein said priority comprises a plurality of tagging values.

26. The computer-readable storage medium of claim 25, wherein said tagging values are integer values.

27. The computer-readable storage medium of claim 22, wherein said nonblocking switch is a crossbar switch.

28. The computer-readable storage medium of claim 22, wherein said nonblocking switch is a Batcher-Banyan self-routing switch.

29. A computer data signal embodied in a carrier wave, comprising computer instructions for:

requesting service for each said input from said designated outputs for said unicast and multicast cells queued at each said input;

granting requests for each said output responsive to said priority and responsive to a grant precedence pointer for said request, wherein said grant precedence pointer is responsive to an individual grant precedence pointer for said unicast cells and responsive to a group grant precedence pointer for said multicast cells;

accepting grants for each said input responsive to said priority and responsive to an accept precedence pointer for said grant, and updating said group grant precedence pointer.

30. The computer data signal of claim 29, wherein said updating is performed when each said multicast cell is transmitted to all designated outputs.

31. The computer data signal of claim 29, wherein said updating is performed when each said multicast cell is transmitted to less than all designated outputs.

32. The computer data signal of claim 29, wherein said priority comprises a plurality of tagging values.

33. The computer data signal of claim 32, wherein said tagging values are integer values.

34. The computer data signal of claim 29, wherein said nonblocking switch is a crossbar switch.

35. The computer data signal of claim 29, wherein said nonblocking switch is a Batcher-Banyan self-routing switch.

* * * * *